United States Patent
Rudrapatna et al.

(10) Patent No.: US 6,188,905 B1
(45) Date of Patent: Feb. 13, 2001

(54) INTELLIGENT DYNAMIC CHANNEL ALLOCATION SCHEME FOR A MOBILE COMMUNICATIONS NETWORK

(75) Inventors: Ashok N. Rudrapatna, Basking Ridge, NJ (US); Dharma P. Agrawal, Raleigh, NC (US); Prathima Agrawal, New Providence, NJ (US)

(73) Assignee: AT&T Corp., New York, NY (US)

( * ) Notice: Under 35 U.S.C. 154(b), the term of this patent shall be extended for 0 days.

(21) Appl. No.: 08/941,043

(22) Filed: Sep. 30, 1997

(51) Int. Cl.$^7$ ...................................................... H04Q 7/22
(52) U.S. Cl. .............................................................. 455/452
(58) Field of Search ..................................... 455/452, 456, 455/457, 442, 440, 437

(56) References Cited

U.S. PATENT DOCUMENTS

| | | | |
|---|---|---|---|
| 5,504,936 | * 4/1996 | Vercauteren | 455/33.2 |
| 5,572,221 | 11/1996 | Marlevi et al. | 342/452 |
| 5,586,170 | * 12/1996 | Lea | 455/452 |
| 5,617,100 | * 4/1997 | Akiyoshi et al. | 455/456 |
| 5,619,552 | * 4/1997 | Karppanen et al. | 379/60 |
| 5,625,668 | * 4/1997 | Loomis et al. | 455/456 |
| 5,666,655 | * 9/1997 | Ishikawa et al. | 455/452 |
| 5,784,695 | * 7/1998 | Upton et al. | 455/442 |

* cited by examiner

*Primary Examiner*—Daniel S. Hunter
*Assistant Examiner*—Thuan T. Nguyen
(74) *Attorney, Agent, or Firm*—Banner & Witcoff, Ltd.

(57) ABSTRACT

Intelligent allocation of wireless resources can help avoid the problems of dropped calls in a mobile communications network. A service for allocating resources is designed to develop profiles of subscribers' mobility. That is, profiles are developed for routes, traveled by subscribers at certain days and times. For example, some subscribers commute to and from work at relatively fixed times. By compiling this information in the profile and tracking the movement of the subscriber, the mobile network can anticipate the subscriber's movement into a next cell. Thus, wireless resources in the next cell can be reserved prior to the anticipated handover of an ongoing call involving the subscriber. Thus, uninterrupted service can be maintained and dropped calls can be avoided.

37 Claims, 3 Drawing Sheets

INTELLIGENT DYNAMIC CHANNEL ALLOCATION SCHEME FOR A MOBILE COMMUNICATIONS NETWORK

TECHNICAL FIELD

This invention relates to a dynamic channel allocation scheme for a mobile communications network and, more particularly, to a scheme for maintaining uninterrupted service in a mobile network.

BACKGROUND OF THE INVENTION

Most existing mobile communication systems incorporate a cellular architecture in which geographical areas are divided into cells. Each cell contains a base station for interfacing mobile units in the cell to a mobile switching center (MSC) and a backbone wired network. The MSC connects the base stations together for communication therebetween and to provide communication with the public switched network. A base station is equipped with radio transceivers that enable rf communications over available frequency channels with mobile units in the cell.

In the area where two neighboring cells intersect, the cells overlap to form a handover region. Handover typically occurs when the signal strength or quality of a connection between a mobile unit and a base station falls below a predetermined threshold. This generally occurs when the mobile unit enters the handover region at the edge of a cell. As the mobile unit moves from one cell to another, an ongoing call involving the mobile unit is handed off from a channel in the current cell to an available channel in the next cell. However, if no channel is available in the next cell, the call drops (i.e., terminates) because the mobile unit moves out of range of the base station of the current cell. Since handover requests for channels come without warning, often wireless resources are not available when needed and calls get dropped.

Dropping calls significantly effects the service quality for cellular customers. In mobile communications systems, it is important that mobile units with an established radio connection on a radio channel are able to maintain that connection when moving from one cell to another cell. Accordingly, there is a need in the art to minimize the number of calls dropped due to handover failure.

SUMMARY OF THE INVENTION

The present invention overcomes the shortcomings of the prior art by providing a scheme which allows essentially uninterrupted cellular service to subscribers. Specifically, the present invention provides an intelligent profile based dynamic channel allocation service feature for individual subscribers.

The present invention exploits the predictability of repetitive travel behavior to anticipate usage. If a mobile unit's instantaneous location is known by the mobile communications network, then that knowledge can be used by the network to anticipate the real time needs of the mobile unit across the network. Thus, scarce and expensive wireless resources can be managed more effectively to maximize their usage and improve the grade of service (GoS) to all end-users.

People commute from their homes to their work locations in the morning and vice versa in the evening generally traveling the same route with a few alternatives. Another group of subscribers who travel the same general route at the same general time includes sales people who regularly go to appointments or see a client. These subscribers commonly make telephone calls and pass through a number of cells during their trip. Thus, an ongoing call involving an individual subscriber is typically subjected to multiple handovers. One of the objects of the present invention is to provide a service feature in the form of uninterrupted service to subscribers who repeatedly travel the same route when using their mobile unit during a particular time period. Another object of the present invention is to implement the service feature transparently to the subscribers without involving redesign of system hardware requirements.

To avoid dropping calls involving the aforementioned subscribers, it is critical to ensure that a free channel is available in the next cell when handover occurs. One of the objects of the present invention is to create profiles of subscribers which include statistical information such as data related to the timing and route regularly traveled. A profile can be createl by geographically tracking the subscribers. In addition, statistics can be compiled to account for diversions resulting from problems such as road congestion and weather.

Another object of the present invention is to utilize a subscriber's profile to anticipate a subscriber's movement along the route and particularly movement from one cell to another. Thus, the subscriber's profile allows the mobile communications system to intelligently allocate channels before entry of the subscriber into the handover region, thereby ensuring that an ongoing call is not dropped. Implementation of the service feature does not burden channel resources since the actual route of a preferred subscriber is followed and channel resources are dynamically allocated on a real time basis once the new cell service area has been accurately determined.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

Figure 1:
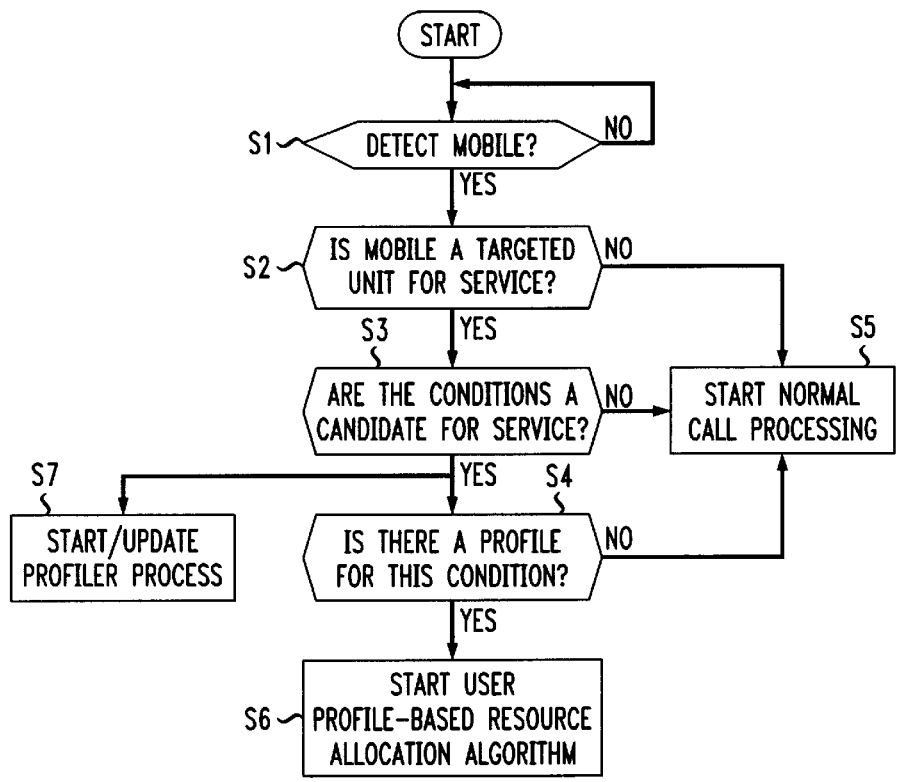
FIG. 1 is a flow chart showing the steps of an overall algorithm for implementing a resource allocation service according to an illustrative embodiment of the present invention.

An illustrative methodology for implementing an intelligent mobile communications system will be described according to the present invention. While the mobile system described below relates to a traditional cellular phone system, it is to be understood that the present invention can be applied to all types of wireless communications systems including, but not limited, to satellite systems, micro cellular systems, personal communications services, and other mobile communication systems. Also, other types of personal communication devices can be implemented in these systems including, but not restricted to, a portable television, a wireless audio video phone, and a pager.

By acquiring the statistical mobility patterns of cellular subscribers and applying the knowledge to allocate resources, handover failures can be minimized. In each cellular area, typically a metropolitan area, a centralized or distributed database containing the mobility profiles of subscribers of the mobile network is created and maintained. This can be accomplished by creating, for each subscriber ID (e.g., mobile phone number and electronic serial number), records having information including cells traversed, time-of-day, day-of-week, etc. Centralized databases can be self-synchronizing. Distributed databases can be synchronized by exchanging profiles, thereby mobility behaviors of subscribers can be maintained. Data from the databases predicts an impending handover to the next and subsequent cells. Thus, channels can be allocated at the predicted time of arrival in the new cell. The accuracy of this scheme depends on the accuracy of the predicted sojourn or travel times across cells. Proper deployment of the wireless resources, such as the frequency channels at appropriate times at cell boundary crossings, minimizes the handover failures and enhances the quality of service. If traveled routes extend beyond a cellular geographic area, channel and cell resource tracking and allocation information can be exchanged with neighboring cellular areas to facilitate deployment of the scheme.

Most cellular customers follow the same route when traveling to and from work. On a less frequent basis, customers travel alternative routes, for instance to avoid congestion and construction, or to commute to secondary business sites etc. Profiles for each subscriber can be generated by collecting statistical data. The wireless resources required for the subscriber can be dynamically allocated using one of the subscriber's profiles. The resource allocation service scheme can be implemented for a subset of users or all users.

Once a subscriber turns on their mobile unit, a user profile is created which continuously tracks the subscriber along a route traveled, for instance a commuting travel path. When the mobile communications system anticipates that the mobile unit will be reaching the end of a geographic or cell service area, the system dynamically allocates channel resources for an ongoing call in the next cell so that the call will continue uninterrupted. This process continues as the subscriber moves from cell to cell until the call terminates. It is to be understood that a base station may be assigned to a cell or a sector. For purposes of this invention, the term cell is generic and means coverage area and as such, includes within its scope the term sector as well as the traditional definition of a cell.

The present invention will be described with reference to FIGS. 1–3. FIG. 1 is a flow chart showing the steps of an overall algorithm for implementing a resource allocation service according to an illustrative embodiment of the present invention.

The mobile communications network first detects whether a mobile unit is in an on state at step S1. If the mobile unit is not in the on state, the process waits until a mobile unit is in the on state. When a wireless subscriber powers on their mobile unit, the system detects the mobile unit. For example, the mobile unit registers with the base station in the cell it is located when it is first turned on. The data may be recorded at a centralized database for the geographic area, such as at the MSC.

Alternatively, a subscriber could send a signal from their mobile unit to the base station to request the resource allocation service. In this instance, the MSC receives a resource allocation service request signal and processes the request in a manner similar to how the registration signal is processed as described below.

When the MSC receives the registration signal, it determines whether the mobile unit is targeted for the resource allocation service as shown in step S2. A mobile unit is targeted for the resource allocation service if the mobile unit's subscriber has subscribed to the service or is otherwise authorized to receive the service. Exemplary authorized mobile units include heavy users or all users.

If the subscriber's mobile unit is not a targeted unit, then normal call processing functions take place whenever the subscriber initiates or receives a call at step S5. If the mobile unit is a targeted unit, then the MSC determines whether other predefined conditions are satisfied at step S3 which indicate whether the resource allocation service is appropriate to use. Predefined conditions may include, but are not limited to, time-of-day (e.g., AM commute, PM commute), day-of-week (e.g., weekday, weekend, holiday), instantaneous location of the mobile unit, and other user preferences (e.g., vehicle driver, destination).

The resource allocation service may be implemented at high cellular use times during the course of a day. For example, on weekends, a particular cell area may not experience channel capacity problems such that the service is not needed. In addition, the mobile network can be designed to activate the resource allocation service on an as needed basis. For example, the base station or MSC may monitor cellular traffic and activate the service for use when a threshold volume of cellular traffic is detected, such as a weekend sporting event.

The cellular handset may be adapted to allow the subscriber to save a few typical travel routes which activate the service. Illustratively, the subscriber, responsive to a prompt on the handset pad, may select a route which corresponds to a route to or from the user's home to a relative or friend's home. In this instance, a signal is passed to the mobile network informing the network of the route to be traveled, at which time the mobile network implements further processing as necessary. Alternatively, the user may create profiles which are stored in the network and which can be subsequently activated when needed.

If the predefined conditions for the preferred mobile unit are not met then normal call processing functions take place at step S5 whenever the subscriber initiates or receives a call. If the predefined conditions are satisfied, then the mobile network determines whether a profile exists for the condition at step S4. In addition, the scheme will initiate creation of a new profile if one does not exist, or update the profile if one exists at step S7. That is, where a profile exists, travel history associated with all future calls can be recorded and processed to continuously update and improve the robustness of the profile data.

Figure 2:
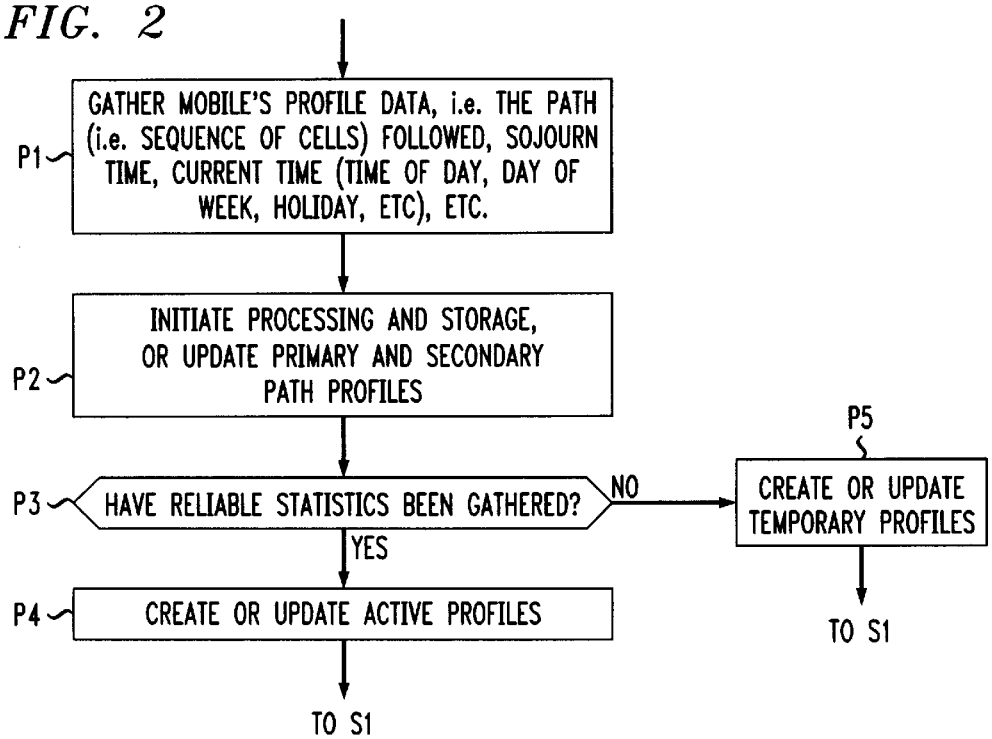
FIG. 2 is a flow chart of the method of establishing and updating a user profile according to an illustrative embodiment of the resource allocation service of the present invention.
Figure 3:
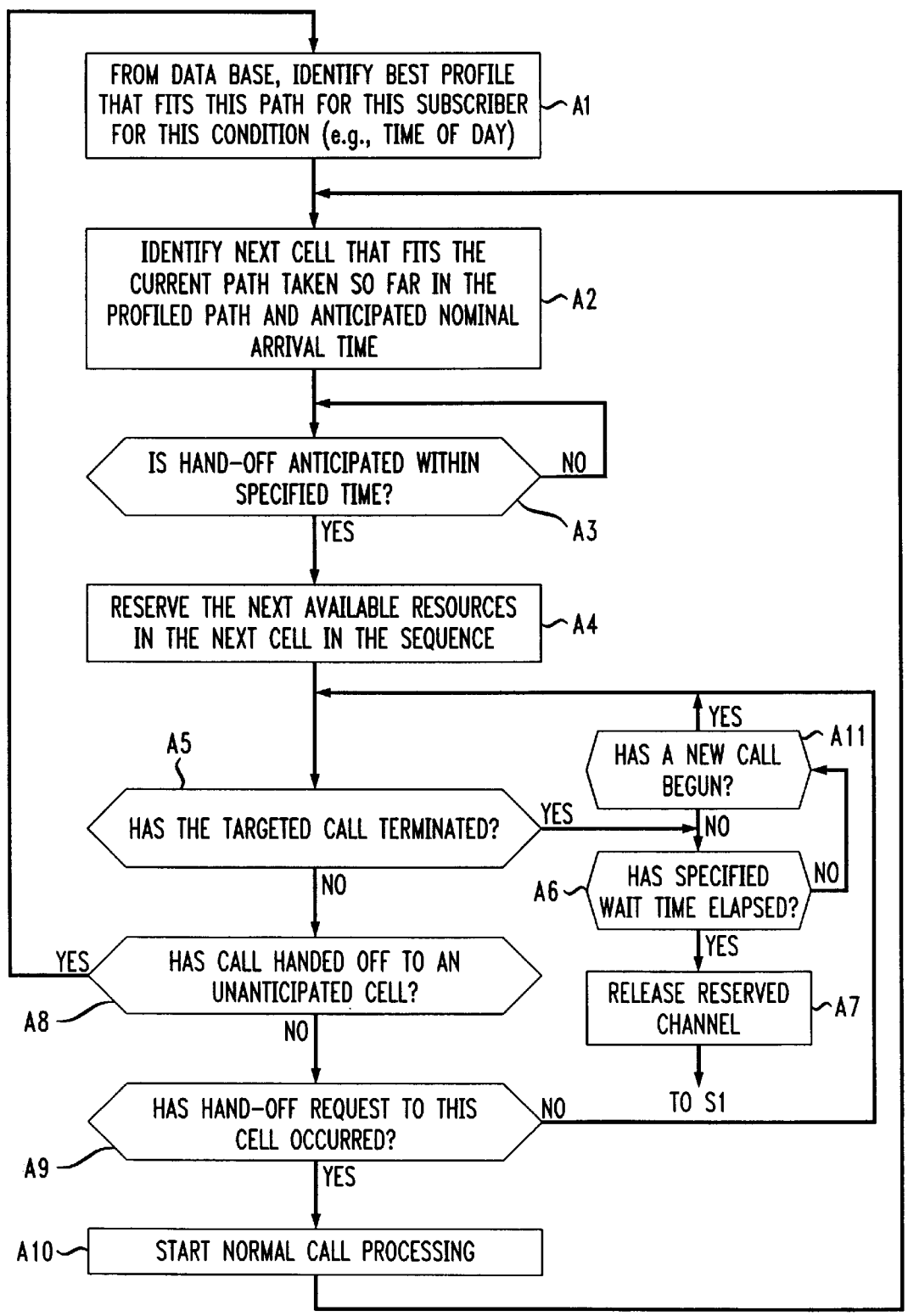
FIG. 3 is a flow chart of the knowledge-based resource allocation algorithm according to an illustrative embodiment of the resource allocation service of the present invention.

The steps involved in creating a profile, as well as updating a profile, are shown in FIG. 2. At step P1, the mobile network gathers profile data that may have a bearing on developing reliable estimates of arrival times in a cell from a mobile unit's previous cell as the subscriber travels to its destination. For example, the mobile network monitors, among other characteristics, the path traveled by the subscriber (i.e., sequence of cells traveled through), the time of the journey from the place of origination to the destination, time to traverse each cell in the path, time-of-day, day-of-week, and holiday information. The mobile network can interface with geographic maps of the area to track the subscriber's movement. For instance, the MSC or base station may be interfaced to a database of maps of a particular area.

The locations of the mobile unit may be determined at varying levels of precision. For example, at a first level, the mobile network may only be able to determine what cell the mobile unit is in. With advanced location tracking technologies such as the global positioning system (GPS) or triangulation techniques, a more precise location in a cell can be determined. It is to be understood that any level of precision from the first level to higher levels can be utilized, and that an increase in precision is accompanied by an increase in the ability to effectively allocate the resources, since the profiles will contain more information. A cell level location technique can be used in conjunction with the present invention, such as the technique described in commonly assigned, concurrently filed application entitled "Method For Predicting the Location of a Mobile Station in a Mobile Communications Network", Ser. No. 08/941,231, filed on Sep. 30, 1997 by the same inventors of the instant application, which is incorporated by reference herein.

The data gathered related to the subscriber is processed and stored by the mobile network (e.g., MSC, base station) at step P2. If no profile previously exists, the information is stored in a temporary profile. Data is collected and stored in a temporary profile until a statistically significant number of samples have been obtained before excluding any information or creating another profile.

At step P3, the data collected is compared to previous data to determine whether the data is reliable using standard statistical analysis. If data for the particular profile has been gathered previously, the data collected is typically used to supplement and fine tune the existing information to create a more accurate profile and to account for extenuating circumstances such as weather, congestion, and alternative routes. If the data satisfies certain criteria and is deemed reliable, then an active profile is updated or created from a temporary file at step P4. Sampling techniques may be used to determine whether sufficient confidence exists to convert a temporary profile to an active profile.

In the event that the information is found unreliable, then a temporary profile is created and/or existing temporary profiles are updated at step P5. Cluster analysis can be used to determine if a new temporary profile should be created. Temporary profiles are maintained for several iterations of the travel route to determine whether the active profile should be altered. In other words, if the user travels a new route or travels to a new workplace, the temporary profile can capture this information. Thus, after, for example a significant number of trips along the same route, the new route can be an alternative to a profile related to the existing route or refinement of the existing route. A database compiles the above route information and transfers temporary profile information to active profiles after a statistically significant measurement has been made.

Data collected is stored in a primary profile or a secondary profile depending on its relation to previous data collected. For instance, when an alternate route is traveled, the mobile network stores the information in a secondary profile and calculates a probability associated with the alternate route or defines an indicator when the route is taken, such as weather problems.

After the profiles have been created or updated in one of steps P4 or P5, the system returns to step S1. Returning to FIG. 1, if a profile has been found to exist at step S4, then the mobile network starts operation of a knowledge-based resource allocation algorithm at step S6.

Operation of the knowledge-based resource allocation algorithm is described below with reference to FIG. 3. At step A1, the data in the database is evaluated and the best profile that fits the path for the subscriber and the condition (e.g., time-of-day) is identified. That is, based on statistical data analysis, such as pattern matching techniques, one of the profiles associated with the subscriber is chosen that best matches the observed conditions of the current call. The best profile at minimum requires that the same sequence of cells in the path of the subscriber be characteristic of the profile. Other profile characteristics are compared using known statistical data analysis techniques, such as cluster analysis.

Thereafter, at step A2, the next cell that fits the path taken in the profiled path is identified and the arrival time of the subscriber in the next cell is anticipated. At step A3, the anticipated arrival time is compared with a time threshold to determine whether hand off is to occur within a specified time. If not, this step is repeated until hand off is expected within the specified time or the call is terminated.

Once hand off is anticipated within the specified time, then, at step A4, resources in the next cell to be traveled in are reserved or allocated for the subscriber. Thus, once the subscriber enters the next cell, an ongoing call is handed over to the resources allocated for the subscriber.

At step A5, it is determined whether the ongoing call involving the subscriber has terminated. If the call has terminated, it is then determined whether a wait lime (e.g., 1–2 min.) for a next call has elapsed before the subscriber initiates or receives another call at step A6. If the time has elapsed, at step A7, the reserve channel is released and available to other subscribers, and the process returns to step S1. If the time has not elapsed at step A6, it is then determined whether a new call has begun at step A11. If a new call has not begun, then the process returns to step A6. If the user initiates a call or receives a call at step A11 then the new call becomes the targeted call and the process returns to step A5.

If the call has not terminated then it is determined whether the call has been handed off to a cell other than the next cell at step A8. If the call has been handed off to an unanticipated cell, then the process returns to step A1. In this instance, the algorithm can account for a deviation in the path taken by the subscriber which may result from congestion, bad weather or another factor causing a secondary profile to be chosen. If no hand off to an unanticipated cell has occurred, it is determined whether hand off has occurred to the resources allocated at the next anticipated cell at step A9. If so, normal call processing continues at step A10, and the process returns to step A2 to begin anticipating the next cell for hand off. Otherwise, control returns to step A5.

As the call progresses over time, the knowledge-based resource allocation algorithm utilizes real time measured parameters associated with the call to execute major or minor midcourse corrections to the applied profile. The adjustments may be minor, such as scaling travel time (e.g., due to variations in traffic levels), or major, such as selecting a new profile.

Figure 4:
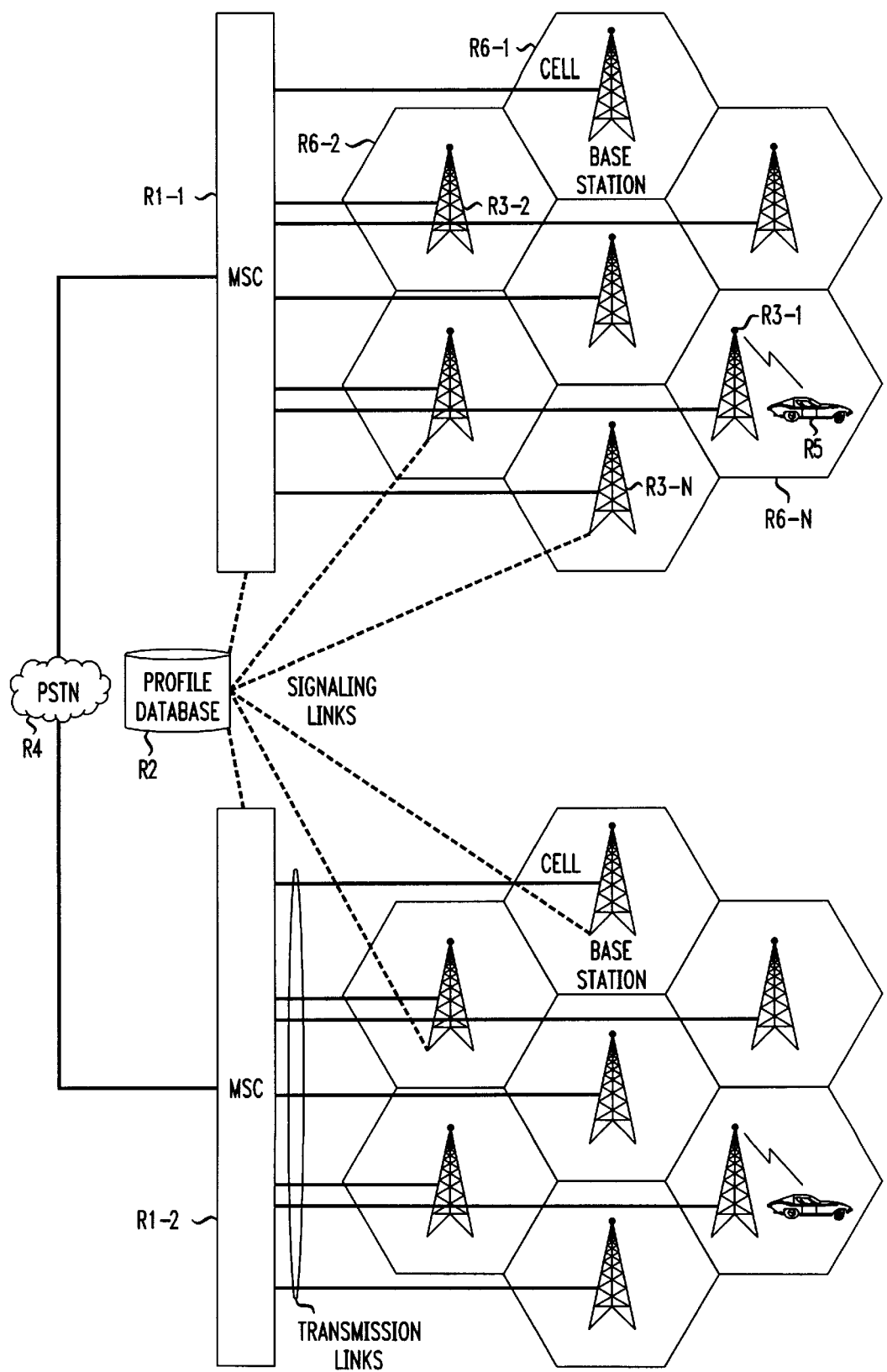
FIG. 4 illustrates an exemplary physical realization of the present invention.

FIG. 4 provides an illustrative physical realization of the present invention. The public switched network (PSTN) R4 is coupled to MSCs Ri-i and R1-2. A profile database R2 si coupled to the base stations (e.g., R3-1, R3-2, R3-N) and the MSCs via signaling links. Transmission links couple the base stations to the MSCs.

The location of mobile station R5, either real-time exact data (e.g., GPS) or data localized to within a cell R6-N, is collected by the profile database R2. The data may be relayed by the base station R3-1 serving the mobile station R5, the MSC R1-1, and the transmission and signaling links to the profile database R2. The profile database R2 will process the user data and develop the user profiles. In the illustrative embodiment described above, the profiler process and knowledge-based resource allocation algorithm can be implemented in the profile database R2. Thus, the database R2 may instruct the MSC and the base stations to reserve the needed channels in the cells in anticipation of the need to serve the mobile stations. The profile database R2 may be located at an MSC as an adjunct processor to the switch, or at a service control point which is an element of the advanced intelligent network (AIN) architecture. If the profile database R2 is not locally implemented at the MSC, it can be accessed by the MSC via a signaling network such as signaling system number 7. A profile database R2 can be configured to serve a large cellular geographic serving area such as a metropolitan area comprising several MSC serving areas.

In an illustrative embodiment of the present invention, it is envisioned that a navigational system in a vehicle can be tied in with a mobile unit coupled to the vehicle to provide a more accurate anticipation of handover resource needs. According to this exemplary embodiment, the user of the vehicle can program a destination into a navigational computer which communicates with the mobile network and provides the path the subscriber will travel to the destination. Thus, the mobile network communicates with the vehicular navigational system to monitor the sequence of cells which the vehicle will traverse on the way to the final destination. This information, in combination with the profile information, provides a highly accurate prediction of when the subscriber will pass from one cell to another.

Currently, some vehicles travel on fixed paths to their destination such as trains, and, in the future, automobiles on certain routes. A rail commuter is a most appropriate subscriber for the resource allocation service due to the high level of predictability in the travel path and anticipated handovers.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for intelligently allocating wireless resources in a mobile communications network, said network including a plurality of cells, said method comprising the steps of:
   storing a profile for a subscriber, wherein the profile includes predetermined path information identifying a path through an area covered by the network;
   receiving a signal, from the subscriber, indicating that the profile is to be used in a call involving the subscriber;
   allocating wireless resources assigned to a first cell in which the subscriber is located at a first time associated with the call;
   tracking a path traveled by the subscriber through the mobile communications network;
   anticipating a second cell to which the subscriber will enter from the first cell based on the profile and the path tracked; and
   reserving wireless resources in the second cell prior to handing off the call at a second time associated with the call.

2. The method according to claim 1, wherein the wireless resources include a voice channel.

3. The method according to claim 1, wherein the wireless resources include a data channel.

4. The method according to claim 1, wherein the wireless resources include a multimedia channel.

5. The method according to claim 1, wherein said step of storing a profile includes the step of gathering data bearing on arrival time of the subscriber in the second cell from the first cell during the call.

6. The method according to claim 5, wherein the data includes time of journey from locations in the first cell to the second cell at different rates of speed.

7. The method according to claim 1, wherein said step of tracking includes estimating location and travel time of the subscriber.

8. The method according to claim 1, wherein said step of reserving wireless resources includes allocating a radio channel for an ongoing call involving the subscriber, the radio channel being selected from a subset of radio channels available for communications between mobile units and a base station in the second cell.

9. The method according to claim 1, further including the step of handing off the call to the wireless resources reserved in the second cell, when the subscriber enters the second cell.

10. The method according to claim 1, further including the step of handing off the call to the wireless resources reserved in the second cell, when the subscriber enters the second cell and handover criteria is satisfied.

11. The method according to claim 1, further including the step of updating the profile during the call.

12. The method according to claim 1, wherein said step of tracking includes tracking a location of the subscriber using a global positioning system.

13. The method according to claim 1, wherein said step of tracking includes tracking a location of the subscriber using a profile database.

14. In a mobile communications network having a plurality of cells, each of the cells assigned a base station, and a resource allocation service for subscribers, a method for intelligently allocating wireless resources to authorized subscribers, said method comprising the steps of:
   storing at least one profile for a subscriber;
   allocating wireless resources assigned to a first cell in which the subscriber is located when a call is established involving the subscriber; and
   determining whether the subscriber is authorized to receive the resource allocation service and whether predefined conditions are satisfied for implementation of the resource allocation service;
   wherein if the predefined conditions are satisfied and the subscriber is authorized,
      tracking a path traveled by the subscriber through the network;
      anticipating a second cell to which the subscriber will enter from the first cell based on the profile and the path tracked; and
      reserving wireless resources in the second cell prior to handing off the call.

15. The method according to claim 14, wherein said step of anticipating, includes selecting a profile from the at least one profile which best matches the conditions of the call.

16. The method according to claim 14, wherein if the subscriber is not authorized or if the predefined conditions are not satisfied, processing the call involving the subscriber normally.

17. The method according to claim 14, wherein the predefined conditions include time-of-day and location of the subscriber.

18. The method according to claim 14, wherein if the subscriber is authorized, updating the profile or creating a new profile.

19. The method according to claim 14, wherein said step of tracking includes tracking a location of the subscriber using a global positioning system.

20. The method according to claim 14, wherein said step of tracking includes tracking a location of the subscriber using a profile database.

21. A method of creating a profile for a subscriber of wireless services in a mobile communications network, said method comprising the steps of:

gathering first data bearing on a subscriber's arrival time in a first cell from a second cell during a first call;

storing the first data in a first profile;

gathering second data bearing on a subscriber's arrival time in the first cell from the second cell during a second call;

comparing the first data and the second data; and either updating the first profile when the first data and the second data include similar data, or storing the second data in a second profile when the first data and the second data fail to have similar data.

22. The method according to claim 21, wherein the first and second data include time of journey from locations in the first cell to the second cell and path traveled.

23. The method according to claim 22, wherein the first and second data include time-of-day and day-of-week.

24. The method according to claim 21, wherein the first and second data include data related to a location and travel time of a subscriber.

25. The method according to claim 24, where the position of a subscriber is estimated using a global positioning system.

26. The method according to claim 24, where the position of a subscriber is estimated using a profile database.

27. The method according to claim 21, wherein the first and second data include data related to traffic conditions and weather conditions.

28. The method according to claim 21, wherein the first and second data include data related to a mobile unit user.

29. The method according to claim 21, wherein the similar data includes path traveled.

30. The method according to claim 29, wherein the similar data further includes time-of-day.

31. The method of claim 1, wherein the call is established after the predetermined path information is stored.

32. The method of claim 1, wherein the step of anticipating includes performing statistical analysis using the profile to identify the second cell.

33. The method of claim 1, wherein the predetermined path information corresponds to a vehicular path between two points.

34. The method of claim 1, wherein the predetermined path information is unique to the subscriber.

35. The method of claim 14, wherein said at least one profile includes predetermined path information.

36. The method of claim 1, wherein the predetermined path information includes information for a plurality of paths of the subscriber, and the signal includes a selection of one of the plurality of paths of the subscriber.

37. The method of claim 21, wherein the first profile is a temporary profile, and the method further comprises the step of converting the first profile from a temporary profile to an active profile if the first profile contains a statistically significant number of entries.

* * * * *